United States Patent Office 3,639,303
Patented Feb. 1, 1972

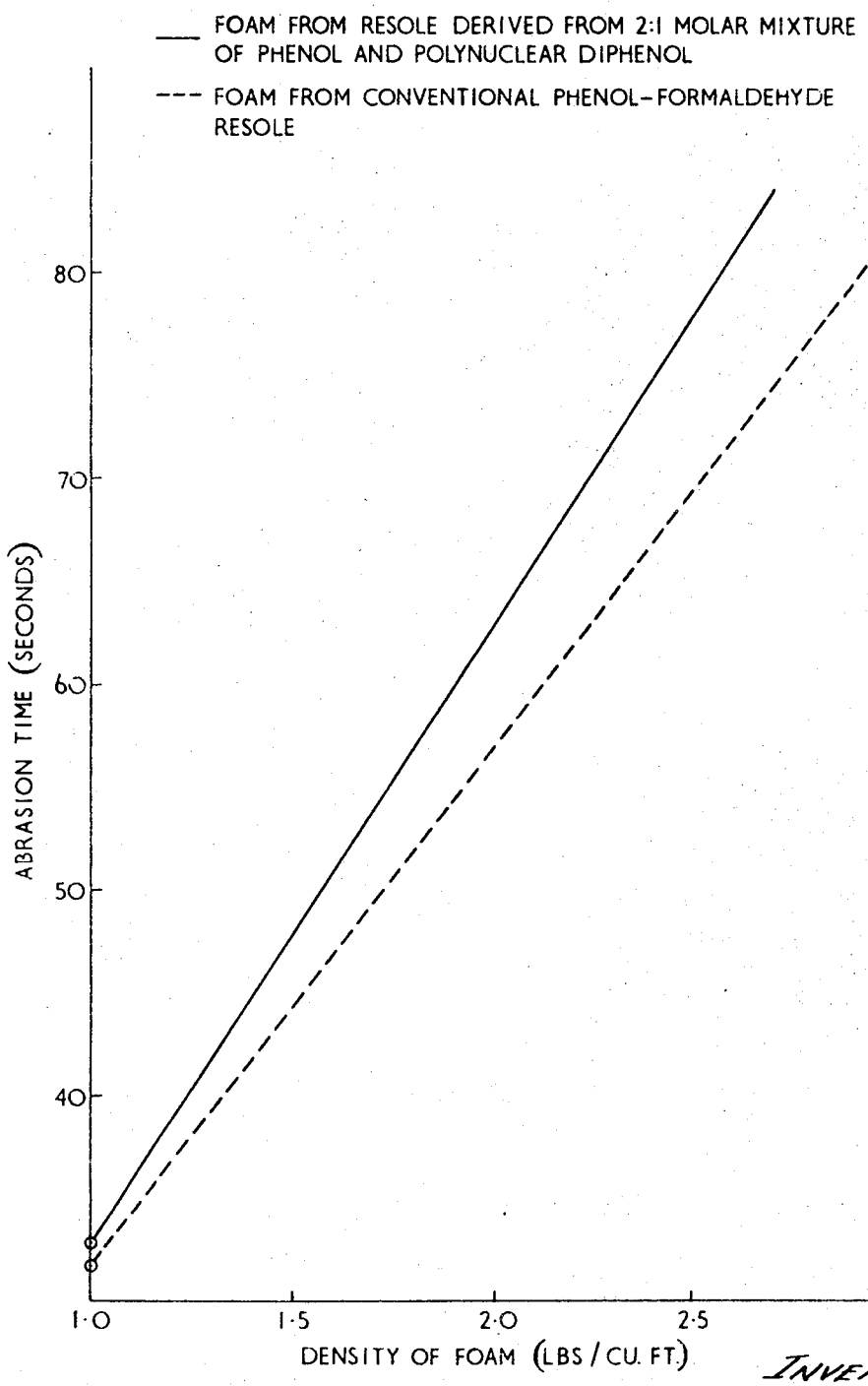

---

3,639,303
PHENOLIC FOAMS
John Penfold, Runcorn, England, assignor to Imperial Chemical Industries Limited, London, England
Filed June 10, 1968, Ser. No. 735,777
Claims priority, application Great Britain, June 15, 1967, 27,734/67; May 27, 1968, 25,158/68
Int. Cl. C08f 47/08; C08j 1/14
U.S. Cl. 260—2.5 F  15 Claims

ABSTRACT OF THE DISCLOSURE

The invention relates to the reaction product of formaldehyde and a mononuclear phenol with a polynuclear diphenol to produce a foam.

---

This invention relates to novel foamed resins of the kind derived from phenolic resoles.

Foamed resins of this kind are cured phenolic resole shapes having a cellular structure. They may be obtained from the resole by mixing it with a compound which is capable of yielding a gas or vapour under the curing conditions and then treating the resole, e.g. by acidification and/or heat, to cause simultaneous foaming and curing.

By phenolic resoles, we mean acid-curable materials, usually aqueous syrups, obtained by hydroxymethylating phenolic compounds (that is, compounds whose molecules each have a benzene ring to which is attached at least one hydroxyl group and a hydrogen atom on at least one carbon atom ortho or para to the hydroxyl bearing carbon atom) with at least an equimolar amount of formaldehyde under basic conditions. The phenolic compound is usually a mononuclear phenol; that is, it is a phenolic compound having only one aromatic ring, e.g. as in phenol which is the most preferred example. Other examples are m-cresol, p-cresol and resorcinol. The formaldehyde is usually supplied from a source thereof, e.g. paraformaldehyde.

Foamed resins from phenol-formaldehyde resoles are in use as heat and sound insulation materials for building applications, and as packaging materials for the protection of goods in transit. However, they suffer from one major drawback; they tend to be brittle and to lack adequate abrasion resistance.

According to the present invention, we provide a foamed resin of a phenolic resole derived from a mixture of phenolic compounds, which mixture contains a polynuclear diphenol having the structure:

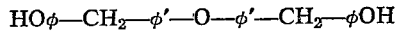

HO$\phi$—CH$_2$—$\phi'$—O—$\phi'$—CH$_2$—$\phi$OH where $\phi$ is the divalent residue of a mononuclear phenol having the structure H$\phi$OH and is preferably a phenylene group but may also be a substituted derivative thereof wherein one or more of the hydrogen atoms have been replaced by monovalent groups selected from alkyl, alkoxy and hydroxy groups and $\phi'$ is most preferably a phenylene group but may also be a substituted derivative thereof wherein one or more of the hydrogen atoms have been replaced by monovalent atoms or groups selected from alkyl and alkoxy groups and halogen atoms, said polynuclear diphenol forming from one eleventh to one third of the total molar concentration of the mixture.

In other words, the molar ratio of the polynuclear diphenol to the other phenolic material making up the mixture is from 1:10 to 1:2. Preferably it is from 1:5 to 1:3.

The alkyl and alkoxy groups in the $\phi$ and $\phi'$ residues, if any, will not normally have more than six carbon atoms.

The presence of the polynuclear diphenol in the prescribed concentration in the phenolic mixture from which the resole is derived leads to the production of foams of improved toughness and abrasion resistance at densities above about 1 lb./cu.ft. Thus, they may be used in lower density forms, e.g. of about 2 lbs./cu.ft. compared with the norm of about 2.5 lbs./cu.ft. for conventional phenol-formaldehyde foams, in structural applications such as, for example, roof decking. Foams obtained when the ratio of other phenolic compounds to polynuclear diphenol is above 10:1 tend to be little different from those obtained from similar foams from resoles from which the polynuclear diphenol is absent. On the other hand, at ratios below 2:1, other physical properties of the foams and the foaming characteristics of the resole, e.g. rise time of the foam, tend to suffer. The optimum combination of properties is generally found when the ratio is from 3:1 to 5:1. Very good foams are obtained when the phenolic compound is phenol and the polynuclear diphenol is a bis(p-hydroxybenzyl) diphenyl ether, e.g. 4,4'-bis(p-hydroxy-benzyl) diphenyl ether.

PRODUCTION OF POLYNUCLEAR DIPHENOL

The polynuclear diphenol may be obtained by heating under neutral or acid conditions at least two moles of a mononuclear phenol with one mole of a dihalide of the structure XCH$_2$—$\phi'$—O—$\phi'$—CH$_2$X where $\phi'$ has the meaning ascribed above and X is halogen, usually chlorine or bromine.

Frequently, by-products of higher molecular weight are also obtained from this synthesis; these by-products being formed, it is believed, by the reaction of further molecules of the dihalide with the desired polynuclear diphenol. The presence of these higher molecular weight by-products can be tolerated provided that their concentration and molecular weight is not such as to cause insoluble products to be present in the resole derived from the mixture. However, the production of these by-products may be reduced or obviated entirely, if desired, by raising the ratio of mononuclear phenol to dihalide to at least 3:1, and preferably at least 4:1, in the reaction mixture.

The production of the polynuclear diphenol may be effected in solution, if desired, and an example of a suitable solvent is sulpholane. Chlorinated hydrocarbons may also be used provided that they do not interfere with the production of the polynuclear diphenol. Preferably, however, the use of solvent is avoided so as to obviate the need for solvent recovery operations.

To achieve acceptable rates of reaction, it is preferred to heat the mixture of mononuclear phenol and dihalide and, where no solvent is present, it is generally desirable at least to supply sufficient heat to melt the mixture. Most preferably, the temperature of reaction is about 60 to 100° C. Higher temperatures may be used if desired but it is then necessary to take precautions to prevent loss of mononuclear phenol through distillation. Also, higher temperatures tend to promote the formation of the resinous and difficultly soluble products which then have to be separated from the desired polynuclear diphenol if difficulties in subsequent resole and foam formation are to be avoided. At lower temperatures, e.g. below 50° C., reaction times of 10 hours or even more may be required.

Preferably the reaction is catalysed by a Friedel-Crafts catalyst. Examples of Friedel-Crafts catalysts for the reaction are ferric chloride, stannic chloride, and boron trifluoride and adducts thereof with electron donor compounds e.g. diethyl ether, but we have found that aluminium chloride and zinc chloride are particularly effective.

In general, it is found desirable to use at least 0.05% of catalyst by weight of compound having the structure I, and usually from 0.1 to 3%. Amounts below 1% are preferred, however, because of the problems involved with neutralising larger amounts in the products obtained from the reaction.

The reaction may be effected under anoxygenic conditions, for example, under an inert gas e.g. nitrogen, to avoid oxidation of the mononuclear phenol; particularly in the preferred case where this is phenol itself. However, this is not essential for success. The application of pressure is not required but stirring is desirable.

The reaction may be followed by watching the evolution of hydrogen halide and may be assumed to be complete when evolution ceases. On completion of the reaction, the mixture may be cooled and the catalyst residues and any hydrogen chloride dissolved in the mixture neutralised, e.g. by addition of base.

The polynuclear diphenol obtained from this reaction may then be seperated from any unreacted mononuclear phenol, and recovered for use in the formation of the phenolic mixtures from which the resoles used in the production of the foamed resin of this invention may be obtained.

However, since the mixtures comprise essentially polynuclear diphenol and unreacted mononuclear phenol, it has been found more advantageous simply either to adjust the ratio of mononuclear phenol to dihalide in the initial reaction mixture to a suitable ratio and then use the product mixture of polynuclear diphenol and unreacted mononuclear phenol in the resole forming reaction without further modification, or to adjust the ratio of mononuclear phenol to polynuclear diphenol in the product mixture by adding further mononuclear phenol or removing excess mononuclear phenol, e.g. by distillation, as desired.

As it requires two moles of the mononuclear phenol to react with one mole of the dihalide to yield the polynuclear diphenol, reaction mixtures of mononuclear phenol and dihalide suitable for conversion to mononuclear phenol/polynuclear diphenol mixtures that may be used in the resole forming reaction without further modification will contain from 4 to 12 moles, and preferably 5 to 7 moles, of mononuclear phenol per mole of dihalide. If concentrations outside these limited are used, the product mixture may be adjusted to the desired composition by addition or removal of mononuclear phenol as desired. Removal of the mononuclear phenol may be effected, for example, by distillation.

Where the product mixture obtained from the polynuclear diphenol forming reaction is intended to be used in the resole forming step without recovering the polynuclear diphenol, and where the production of the polynuclear diphenol has been aided by a Friedel-Crafts catalyst, it has been found particularly convenient to combine into a single operation the steps of neutralising the catalyst and rendering the mixture basic for the resole forming step. Thus, sufficient base may be added to neutralise the catalyst, e.g. as shown by a pH paper test, and then an excess of preferably 1 to 1.5% by weight (based on the weight of mononuclear phenolic compound used in the reaction) may be added to ensure that the mixture is rendered basic.

A base such as is used in conventional phenolic resole production is preferred and examples are alkali metal hydroxides and carbonates, barium hydroxide, and organic bases, e.g. triethylamine. Profitably, it may be added as a solution in water, the amount of water being chosen to adjust the viscosity such that the resole derived from the mixture has the most suitable viscosity for conversion to foams of good physical properties. The viscosity of the resole is preferably equivalent to 100 to 300, and most preferably 120 to 150, Gardner-Holtz seconds.

PRODUCTION OF RESOLES

The mixtures of mononuclear phenol and polynuclear diphenol may be converted to resoles in conventional manner for phenolic resoles; that is by reaction with formaldehyde, or more usually an equivalent quantity of a formaldehyde source, e.g. paraformaldehyde, under basic conditions, and generally with the application of heat.

In order to produce a rapid curing resole, it is preferred to provide at least one mole of formaldehyde per mole of phenolic component, it being understood that each mole of the diphenol in the mixture counts as two moles of phenolic component. Where the mixture is the unmodified product of the mononuclear phenol/dihalide reaction, this means that the amount of formaldehyde provided is at least one mole/mole of mononuclear phenol in the original reaction mixture. Preferably, amounts of from 1 to 3 moles of formaldehyde per mole of phenolic component are supplied.

We have found that the exotherm of the curing reaction is somewhat less for our specified resoles than for similar resoles from which the polynuclear diphenol is absent, and that the reduction in the exotherm is approximately proportional to the concentration of polynuclear diphenol in the phenolic component. For the production of foams of good physical properties, it is desirable to obviate this loss in exotherm as far as possible since a low exotherm prevents the successful production of uniform cell size in the foam. Obviation of this loss of exotherm is also desirable in foam laminate production in order to avoid long cure times and hence slow rates of production on continuous equipment. To some extent, this may be achieved by reducing the concentration of formaldehyde used in the resole formation and we have found that for most ratios of mononuclear phenol to polynuclear diphenol within our specified range, it is desirable to use from 1.5 to 2.0, and preferably from 1.5 to 1.8 moles of formaldehyde per mole of phenolic component. It is also profitable to use a shorter condensation time than is usual for conventional phenol-formaldehyde resole production, times of from 50 to 60 minutes being preferred. For mixtures where the molar ratio of mononuclear phenol to polynuclear phenol is much below 2 to 1, however, the exotherm is generally irreparably inadequate for the production of good foams since the number of methylol groups per unit weight of the resole is too low.

Preferably, the resole-forming reaction is aided by heat, and temperatures of from 80–100° C. have been found convenient. In general, times of from 50 to 120 minutes are adequate when using temperatures of from 90 to 100° C. Completion of the reaction may be confirmed by obtaining negative results from a test for phenolic groups. However, it may be desirable to halt the reaction before theoretical completion is reached in order to achieve the desired viscosity and cure exotherm. The point at which the resole has achieved the desired properties may be checked by sampling.

As in the reaction to form the polynuclear diphenol, operation under anoxygenic conditions, may be considered, particularly where phenol itself is used, although we have operated successfully in air. The use of superatmospheric pressures is recommended where it is desired to raise the temperature of reaction. It is also preferable to stir the mixture. On completion of the reaction, and after cooling, a viscous syrup is generally obtained which may tend to be opaque at room temperature although it generally becomes transparent on warming. The syrups are generally more viscous than those obtained under similar conditions but from a phenolic component from which the polynuclear diphenol is absent. Preferably, the pH of the syrup is reduced to a value of about 7 to 9 so as to provide a material which is more stable on storage; the lower values in general giving the greater stability. Most preferably, the pH is adjusted to about 7 to 8. To obtain the best foams, it is also preferred if necessary, to adjust the viscosity of the resole to correspond to 100 to 300, most preferably 120 to 150 Gardner-Holtz seconds. Such adjustment may be accomplished, for example, by the addition or removal of water.

PRODUCTION OF FOAMS

Foamed products may be obtained by mixing the resole with a compound which will yield gas or vapour, e.g. by boiling or by chemical reaction, under the conditions chosen for curing and then curing the mixture. Any conventional gas- or vapour-generating compound for use in the production of phenolic foams may be used. Preferred examples, however, are low boiling hydrocarbons and fluorocarbons, e.g. n-pentane, monofluorotrichloromethane, and 1,1,2-trichloro-1,2,2-trifluoroethane. The amount added will depend upon the density required in the product but amounts to form from 1 to 15% of the total weight of the mixture are usual, from 6 to 10% being preferred. The mixing process is carried out under conditions at which little or no gas or vapour generation will occur.

In order to improve the uniformity of the pore size in the foamed products, it has been found advantageous to add a surfactant, preferably a non-ionic surfactant, to the mixture of resole and gas-generating compound. The use of such surfactants is well known in phenolic resole foam art and concentrations of from 1 to 5% by weight of resole are generally used.

The mixture may be cured in conventional manner for phenolic resoles; that is by adjusting the pH of the mixture to less than 7 e.g. by the addition of acid. The exotherm may be increased somewhat, if desired, by addition of excess acid, and heat may be applied to obtain faster curing. Mineral acids are widely used and hydrochloric acid has been found very satisfactory. As is known in phenolic foam art, if desired, the acid may be added in the form of a mixture with an inert diluent in order to aid the speedy production of a smooth mix before the onset of curing.

At densities above 1 lb./cu. ft., the foamed products obtained have improved toughness and abrasion resistance compared with conventional phenol-formaldehyde foams of the same density; and the improvement in abrasion resistance tends to improve with increase in density. This is represented graphically in the figure accompanying the specification. The figure shows the curve obtained from plotting abrasion resistance (measured as described in Example 1) against density for a number of foams derived from a resole whose phenolic component consisted of a 2:1 molar mixture of phenol and 4,4'-bis(p-hydroxybenzyl) diphenyl ether using n-pentane as a blowing agent. For comparison, the curve obtained from similar foams in which the phenolic component is phenol alone is also shown. Curves for foams from resoles derived from phenol/4,4'-bis(p-hydroxybenzyl) diphenyl ether mixtures with molar ratios between 2:1 and 10:1 will lie between the two curves shown.

As one consequence of these improved properties, the foams of our invention may replace conventional phenol-formaldehyde foams of higher density in structural applications such as, for example, roof decking, with a consequence saving in weight. The improved thermal insulation of some of our preferred foams is also particularly advantageous in this application.

Many of the preferred foams, wherein the mononuclear phenol is phenol itself and the polynuclear diphenol is a bis(p-hydroxybenzyl) diphenyl ether, are also characterised by having a very low permeability to water vapour and the like. Their closed cell content is generally greater than 90% compared with 0 to 50% for conventional phenol-formaldehyde foams. In this respect they are comparable with the generally more expensive polyurethane foams. They also show reduced friability compared with conventional phenol-formaldehyde foams and significantly improved thermal insulation properties which in some cases can even exceed those of polyurethane foams.

In their reluctance to support combustion, their resistance to penetration to naked flame, and their low toxic vapour content, they substantially retain the characteristics of conventional phenol-formaldehyde resins and are sometimes superior. They are, therefore, of particular interest in building applications where such properties are highly desired.

The foams may be used as unmodified slabstock, e.g. in packaging applications, or may also be used in the form of laminates, e.g. where one or more faces of the foamed slab are covered by a thin sheet material, preferably of high bulk modulus, e.g. asbestos, paper, cardboard, hardboard, plasterboard, Formica, metal or synthetic resin e.g. poly(vinyl chloride) or polyolefin e.g. polyethylene. Sandwich structures with the foam in between two parallel spaced thin sheet materials of high bulk modulus are of particular use as building components, e.g. as partitioning.

The laminates may be formed, for example, by coating the sheet material with the uncured foamable mixture and then foaming and curing it in situ. Alternatively the uncured foamable mixture may be fed between two substantially parallel spaced sheets and allowed to foam and cure in place between them to form a sandwich structure. Both methods are readily adapted to continuous operation.

The invention is now illustrated by the following examples in which all parts are expressed as parts by weight.

Example 1

(A) Preparation of polynuclear diphenol.—564 parts (6 moles) of phenol were placed in a glass reactor vessel fitted with a stirrer and a thermometer. The phenol was melted by warming the vessel in an oil bath to 50° C., 1 part of aluminium chloride was added and the mixture stirred. 267 parts (1 mole) of 4,4'-bis(chloromethyl) diphenyl ether were added slowly in portions, allowing the vigorous evolution of hydrogen chloride to subside after the addition of each portion before adding the next. The mixture was stirred continuously.

On completion of the addition, the flask was warmed to 75° C. and maintained at that temperature for 5 hours. The resultant syrup was then neutralized by carefully adding concentrated sodium hydroxide solution and establishing the neutral point by pH paper.

The product consisted essentially of 4,4'-bis(p-hydroxybenzyl) diphenyl ether and unreacted phenol in the molar ratio of about 1 to 4. The former compound could be separated at this stage, if desired, for example by removing the phenol, e.g. by steam distillation.

(B) Formation of resole.—In this case, however, no separation was effected and the syrupy mixture was cooled to 40° C. and treated with 330 parts of paraformaldehyde (equivalent to 11 moles of formaldehyde and therefore a molar ratio of about 1.83 moles of formaldehyde per mole of phenolic component) with stirring. A slurry was formed and this was then diluted with 170 parts of water to adjust the viscosity, and 5 parts of sodium hydroxide to make it basic.

The mixture was then warmed gradually to 90° C. with rapid stirring and maintained at that temperature for 75–90 minutes. viscosity of the resole so obtained was then about 120 Gardner-Holtz seconds.

(C) Production of foams.—Three foams of different densities were formed from this resole by mixing it in each case with 2.5% by weight of the resole of a conventional non-ionic surface active agent for phenol-formaldehyde foams, 5%, 7% and 10% respectively, by weight of the resole of n-pentane as the gas-generating compound, and 3.7% by weight of 36.5% hydrochloric acid (diluted with an approximately equal volume of inert diluent) as the acid curing agent. In each case, the ingredients were blended with the resole in an homogeniser; the pentane and surface active agent first, followed by the acid. The mixture so obtained was transferred to an oven at 60° C. and left there until a cured foam was obtained. In each case, the cured foam was white in colour and did not fade as much as conventional phenol-formaldehyde foams on storage.

The abrasion resistance, modulus, compressive strength and density of each foam were then measured and a graph of physical properties against density plotted from the results. The properties of a foam of intermediate density were then derived from the graph for comparison with a conventional phenol-formaldehyde foam of the same density. The results are tabulated on the following page.

|  | Conventional foam (density: 2 lbs./cu. ft.) | Foam according to the invention (density: 2 lbs./cu. ft.) |
| --- | --- | --- |
| Abrasion resistance (seconds) [1] | 57 | 60 |
| Modulus (lbs./sq. in.) (measured parallel to foam rise) [2] | 670 | 580 |
| Compressive strength (lbs./sq. in.) (measured parallel to foam rise) [2] | 35 | 35 |

[1] The abrasion resistance in this and following examples was measured using the method and apparatus described on p. 241 of "British Plastics" of May 1961, using a No. 180/E grade disc. A longer time indicates a higher resistance to abrasion. Abrasion resistance is also a reflection of the impact strength or toughness of the resin.

[2] The modulus and compressive strength in this and following examples were both measured on a Type E Hounsfield Tensometer at room temperature, using a cross-head speed of one inch per minute and a specimen 2 inches by 2 inches by 1 inch thick.

Example 2

The process of Example 1(A) was repeated using 376 parts (4 moles) of phenol and the product so obtained, which was a mixture of phenol and polynuclear diphenol in the molar ratio of about 2:1, was converted to resole by the process of Example 1(B) but using only 240 parts of paraformaldehyde (equivalent to a ratio of 2 moles of formaldehyde per mole of phenolic component), and a reaction time of 2 hours. The resulting resole was opaque.

Three foams of different densities were obtainerd from the resole by the method described in Example 1 and the properties measured on them were plotted on a graph against density. From this graph, the properties of a foam having a density of 2 lbs./cu. ft. were derived and found to be as follows:

Abrasion resistance (seconds)—67
Modulus (lbs./sq. in.)—540 (parallel to foam rise)
Compressive strength (lbs./sq. in.)—32 (parallel to foam rise)

Example 3

940 parts (10 moles) of phenol were melted in a reactor flask by warming on an oil-bath at 50° C. 2 parts of anhydrous aluminium chloride were added, with stirring followed by a gradual addition of 267 parts (1 mole) of 4,4'-bis(chloromethyl)diphenyl ether.

The flask was then heated to 75° C. and the reactants stirred for 5 hours at this temperature. A thin syrup was formed from which the polynuclear diphenol, identified by infra-red examination, nuclear magnetic resonance and elemental analysis as being 4,4'-bis(p-hydroxybenzyl) diphenyl ether, could be recovered if desired. Alternatively, the mixture, containing phenol and polynuclear diphenol in a molar ratio of about 8 to 1, could be converted to a resole and thence to foams of varying density in accordance with the process described in Example 1.

Example 4

The process of Example 1(A) was repeated using 470 parts (5 moles) of phenol and the resulting product, containing phenol and polynuclear diphenol in a molar ratio of about 3:1, was converted to resole by the process of Example 1(B), with the exception that all the water was added at the neutralisation stage and that 300 parts of paraformaldehyde (equivalent to 2 moles of formaldehyde/mole of phenolic component) were used. The reaction time was 75–90 minutes at 90° C.

Three foams of different densities were made by the method described in Example 1 and the abrasion resistance of each sampel was measured and recorded below:

|  | Density of foam, lbs./cu. ft. | Abrasion resistance, secs. |
| --- | --- | --- |
| Experiment: |  |  |
| A | 1.46 | 42 |
| B | 1.65 | 50 |
| C | 2.8 | 88 |
| From graph | 2 | 62 |

Example 5

The process of Example 1(A) was repeated but sufficient phenol was removed by vacuum distillation at 55° C. and 15 mins. of Hg absolute pressure after completion of the reaction to leave a mixture wherein the molar ratio of phenol to polynuclear diphenol was about 3 to 1. The resole and three foams of different densities were made by the process of Example 4. The abrasion resistance of each foam was measured and recorded below.

|  | Density of foam, lbs./cu. ft. | Abrasion resistance, secs. |
| --- | --- | --- |
| Experiment: |  |  |
| D | 1.44 | 47 |
| E | 1.71 | 51 |
| F | 2.68 | 81 |
| From graph | 2 | 62 |

Example 6

466 parts of phenol were melted in a glass reactor fitted with a stirrer, powder funnel and thermometer pocket, and heated by means of an oil bath. 7 parts of powdered technical grade zinc chloride were added to the molten phenol followed by 260 parts of 4,4'-bis-(chloromethyl) diphenyl ether which was added slowly over a period of up to 45 minutes. A vigorous evolution of hydrogen chloride ensued. Heating of the mixture was continued until no more hydrogen chloride fumes were evolved. The mixture (which contained phenol and polynuclear diphenol in a molar ratio of about 3:1) was then cooled and neutralised to a pH of 7 to 7.5 using 20% sodium hydroxide solution. A further 3.5 parts of the sodium hydroxide solution were then added together with 297 parts of paraformaldehyde and enough water to bring the total water content to 12 to 13% by weight of the mixture.

The temperature of the mixture was then raised to 90° C. and maintained at 90° C. for one hour, the exotherm being controlled by applying cooling to the reaction vessel. The viscosity of the resole was then adjusted to 140 seconds on the Gardner-Holtz scale by removal of water by distillation at water pump pressure.

The initial rate of cure of the resole was measured by mixing a 100 g. sample thereof with 20 cc. of a 50/50 volume mixture of hydrochloric acid (sp.gr. 1.18) and an inert diluent at 25° C. and measuring the rise in temperature that occurred in the first five minutes after complete mixing. This was found to be 11–13° C.

Foams were then prepared from the resole by intimately mixing together 200 parts thereof, 5 parts of a non-ionic surfactant conventionally used in phenolic foam production, varying concentrations of n-pentane between 6 and 20 parts, and 15 parts of a 50/50 volume mixture of hydrochloric acid and diluent, using a high speed stirrer. The smooth emulsified liquid so obtained was then poured into a previously warmed open container and placed in a hot air oven at 55 to 60° C. until the foam had risen and cured. The rise time was generally about 20 minutes and the cure time (the time at which the foam loses its softness) 30 to 35 minutes. The foams were then heated for a further 24 hours at 50° C. ±5° C. in a hot air oven to complete cross-linking.

The properties of foams of various densities obtained in this manner are tabulated below. All these foams had small and regular cells, were white as formed and showed little or no sign of fading after 3 weeks.

| Molar ratio of phenol to diphenol. | Density (lbs./cu. ft.) | Abrasion time, secs. (the figures in brackets are for conventional phenol-formaldehyde foam) | Compressive strength (lbs./sq. in.)[1] | Compressive modulus (lbs./sq. in.)[1] |
|---|---|---|---|---|
| 2:1 | 1.49 | 53 [44] | 19.7 | 560 |
| 2:1 | 2.14 | 70 [60] | 28.5 | 650 |
| 2:1 | 2.45 | 78 [68] | 46.3 | 1130 |
| 4:1 | 1.71 | 50 [49] | 25.8 | 580 |
| 4:1 | 2.22 | 68 [62] | 40.6 | 910 |
| 4:1 | 2.91 | 86 [80] | 61.7 | 1400 |

[1] Measured paralell to foam rise.

| Density (lbs./cu. ft.) | Abrasion time, seconds (The figures in brackets are for a conventional phenol-formaldehyde foam) | Compressive strength (lbs./sq. in.)[1] | Compressive modulus (lbs./sq. in.)[1] |
|---|---|---|---|
| 1.37 | 42 [41] | 17 | 455 |
| 1.58 | 50 [46] | 25 | 665 |
| 2.66 | 88 [73½] | 60 | 1265 |

[1] Measured parallel to foam rise.

Example 7

The process of Example 6 was repeated but the viscosity of the resole was adjusted to just over 200 Gardner-Holtz seconds. Foams were produced as described in Example 6 and their properties are tabulated on the following page. The foams were all white and of small regular cells as formed and were still white after three weeks. The cure times were all in the range 34 to 35 minutes at 60° C.

| Density (lbs./cu. ft.) | Abrasion time, seconds (The figures in brackets are for a conventional phenol-formaldehyde foam) | Compressive strength (lbs./sq. in.)[1] | Compressive modulus (lbs./sq. in.)[1] |
|---|---|---|---|
| 1.40 | 47 [41] | 20.7 | 500 |
| 1.65 | 51 [48] | 25.6 | 650 |
| 2.60 | 81 [72] | 54.5 | 1250 |

[1] Measured parallel to foam use.

Example 8

In two experiments using the process and the reagents described in Example 6 but varying the amount of phenol, and the amount of paraformaldehyde to maintain the same formaldehyde/phenol molar ratio, two resoles were obtained, one having a phenol/polynuclear diphenol molar ratio of 2:1 and the other of 4:1. Both resoles were adjusted to have viscosities of from 125–140 Gardner-Holtz seconds. Foams of varying densities were prepared from each of the resoles using the method and ingredients described in Examples 6 and the properties of the foams are tabulated below. The foams from the 4:1 resole had smaller cells than those from the 2:1 resole.

The initial rate of cure of the 2:1 resole was such as to give a temperature rise of 7–8° C. in five minutes (determined as described in Example 6). That of the 4:1 resole gave 15–17° C. rise. The foam rise time of the 2:1 resole was 30–35 minutes while that of the 4:1 resole was about 10 minutes. Cure times were 50–60 minutes and 25–30 minutes respectively.

Example 9

The resole-forming process of Example 6 was repeated but using varying concentrations of paraformaldehyde and the resultant effect on initial rate of cure of the resoles so produced (determined as described in Example 6) is shown in the table below.

| Molar ratio of formaldehyde to phenol [1] | Temperature rise in first 5 minutes after completion of mixing (° C). | Viscosity of resole after 24 hours standing (Gardner-Holtz seconds) |
|---|---|---|
| 2:1 | 12.5 | 270 |
| 1.5:1 | 31 | 226 |
| 1.58:1 | 22 | 140 |

[1] Calculated as initially used in reaction with dihalide.

Example 10

Four 3:1 phenol/polynuclear diphenol resoles were prepared, each as described in Example 6 except that the amount of paraformaldehyde used was reduced to 235 parts in order to improve the initial rate of cure to give a rise of at least 20° C. in the first 5 minutes after mixing. Their viscosities were adjusted to be 126, 120, 192 and 180 Gardner-Holtz seconds, respectively.

5.5 kg. of the mixture of these resoles were blended with 0.138 kg. of a non-ionic surfactant conventionally used in phenolic foam production, 0.230 kg. of monofluorotrichloromethane, and 0.460 kg. of 1,1,2-trichloro-1,2,2-trifluoroethane, and the mixture was added to one reservoir of a Viking foam dispenser. A 50/50 volume mixture of hydrochloric acid (sp. gr. 1.18) and inert diluent was added to another reservoir of the dispenser. In a series of experiments, the contents of the two reservoirs were then metered separately and at varying rates into the stirred helical mixing chamber and the creams so produced fed into box-shaped containers where the foams were allowed to rise and cure.

The resole temperature and its rate of feed and the rate of feed of the catalyst mixture are tabulated below.

| Experiment | Resole temperatures (° C.) | Resole feed rate (kg./minutes) | Catalyst feed rate (cc./minutes) |
|---|---|---|---|
| G | 25 | 1.15 | 110 |
| H | 25 | 1.15 | 110 |
| J | 25 | 1.15 | 137 |
| K | 25 | 1.92 | 235 |
| L | 25 | 1.92 | 182 |

The foams, which all had densities in the range 2.0 to 2.2 lb./cu. ft., exhibited abrasion times of 64 to 70 seconds compared with 57 to 62 seconds for foams from conventional phenolformaldehyde resins in the same density range.

Some physical properties of these foams are tabulated below.

|  | Parallel foam rise | Perpendicular to foam rise |
|---|---|---|
| Lbs./sq. in.: |  |  |
| Compressive strength[1] | 21.0–27.5 | 22.9–28.5 |
| Compressive modulus[1] | 670–950 | 830–1,050 |
| Shear strength[1] | 12.5–15.6 | (3) |
| Do[2] | 14.1–15.7 | (3) |
| Shear modulus[1] | 270–360 | (3) |
| Tensile strength[1] | 11.6–16.4 | 9.7–11.5 |

[1] Measured as described in Example 1 but with a cross-head speed of 0.552 inch/minute.
[2] Measured as described in Example 1 but with a cross-head speed of 0.056 inch/minute.
[3] Not measured.

Example 11

The process and recipe of Example 10 was repeated but with a reduced amount of halogenated hydrocarbon to yield a foam having a density of 2.35 lbs./cu. ft.

The percentage volume of the foam into which air could not penetrate was found to be 96%. This is what is referred to as the "closed cell content" of the foam.

The dimensional stability of the foam was examined by exposing thin (6" x 6" x ½") slices thereof, taken normal to the foam rise direction to various atmospheric conditions for various lengths of time. At the end of the exposure, a piece of 0.0025 inch thick aluminium foil was cut to the identical area of the test piece and its weight compared with a 6" x 6" square cut from the same piece of foil. The difference in weight represents the change in area of the foam specimen resulting from the exposure. This has been found, on experiment, to be equal to the change in volume. The dimensional stability of the foam to each set of conditions is therefore represented as its percent change in volume which is derived from the following expression:

$$\frac{Wf - Ws}{Ws} \times 100$$

where $Wf$ is the weight of the piece of aluminium foil which is a facsimile of the specimen after exposure, and $Ws$ is the weight of the 6" x 6" square piece of foil.

The results were as follows:

| Temperature, °C. | Percent change in volume after— | |
|---|---|---|
|  | 24 hours | 7 days |
| −15 | −1.5 | (1) |
| Room temperature | +0.2 | (1) |
| 70 | +0.8 | +0.6 |
| 100 | +1.0 | +3.1 |
| 125 | +1.5 | +8.8 |
| 70 plus 100% relative humidity | −0.8 | +2.5 |
| 5 lbs./sq. in. steam at 105° C. | +51.9 | +54.5 |

[1] Not measured.

Other recorded properties were as follows; with the recorded properties of other foams included for comparison.

|  | Foam according to invention | Polyurethane foam | Conventional phenolformaldehyde foam |
|---|---|---|---|
| Density (lbs./cu. ft.) | 2.35 | 2.35 | 2.35 |
| Burn through time [1] (mins.) | 2.5 | 0.5–0.7 | [2] 3 |
| British Standard 476: Surface spread of flame | Class 1 | Class 4 | Class 1 |
| Thermal conductivity [3] (B.t.u./ft.[2] h., °F.) | 0.102 | 0.125 | 0.200 |
| Softening temperature (°C.) [4] | 131 | 145 | [2] 160 |

[1] Measured by National of Bureau Mines test (see U.S. Department of Interior, Bureau of Mines, Report of Investigation No. 6366, 1964).
[2] About.
[3] ASTM Test C. 177.
[4] DIN Method No. 53424.

Example 12

This example relates to the production of foam laminates comprising a sandwich of foam between two brown paper sheets.

The apparatus was of conventional kind and comprised two rollers mounted one directly above the other with their axes parallel, and designed to carry the two rolls of brown paper; a pair of nip rollers designed to receive the sheets of brown paper from the rollers; means for dispensing the foamable liquid on to the top surface of the lower sheet of brown paper just before the nip rollers; an oven beyond the nip rollers and through which the sandwich of foamable liquid and brown paper is drawn so as to foam and set the liquid thereby forming the laminate, which oven has 6 separately controllable heating zones; and means for drawing the laminate from the oven.

Six resoles were prepared each as described in Example 6 but using only 235 parts of paraformaldehyde. The viscosities of the resoles (measured on the Gardner-Holtz scale) were 143, 228, 165, 460, 350 and 93 seconds respectively and their initial cure rates (measured as described in Example 6) corresponded to 55° C., 55° C., 54° C., 62° C., 53° C. and 44° C. rises in temperature in the first five minutes. These six resoles were combined to form one large batch. A mixture of this mixture of resoles with a non-ionic surfactant, monofluorotrichloromethane and 1,1,2-trichloro-1,2,2-trifluoroethane was prepared exactly as described in Example 10 and charged to one reservoir of a Viking foam dispenser. A 50/50 volume mixture of concentrated hydrochloric acid and inert diluent was added to another reservoir of the dispenser. The contents of the reservoirs were metered separately into a helical mixing head in the dispenser and mixed into a creamy fluid. This was transferred to the dispensing means whence it was laid down evenly in the centre of the upper surface of the lower travelling belt of brown paper just short of the nip so that the passage of the two belts of brown paper through the nip promoted uniform spreading of the foam across the entire width of the paper, thus forming a sandwich structure of brown paper, creamy fluid and brown paper, of substantially uniform thickness across its width. The sandwich structure then passed through the air oven where the creamy fluid foamed and set. The continuous laminate so formed was drawn off, cut into sections and each section was post cured for 12 hours at 55° C.

Several laminates were formed using different rates of haul-off of the laminate, different ratios of resole output to catalyst output in the Viking foam machine and different oven temperatures. The table below sets out the conditions used in each experiment. In all cases, the feed rate of the resole mixture to the mixer in the Viking machine was 0.50 kg./minute and the temperature of the resole mixture was 30° C.

| Experiment No. | Catalyst feed rate (cc./minute) | Laminate haul off rate (inches/minute) | Zone temperatures in oven (° C.) |
|---|---|---|---|
| M | 68 | 24 | 74, 74, 74, 70, 71, 74 |
| N | 68 | 34 | 81, 81, 72, 72, 75, 73 |
| P | 70 | 38 | 98, 100, 105, 85, 83, 82 |

The mechanical and physical properties of the laminates so obtained are tabulated on the following page.

| | Experiment Number | | |
|---|---|---|---|
| | M | N | P |
| Density (lbs./cu.ft.) | 2.28 | 2.20 | 2.01 |
| Closed cell content (Percent) | 90-98 | 96-100 | 90-100 |
| Abrasion time [1] (seconds) | 79 | 68 | 70 |
| Compressive strength [2] (lbs./sq. in.) | 28.1 | 24.2 | 19.5 |
| Compressive modulus [2] (lbs/sq. in) | 1450 | 1445 | 761 |
| Shear strength [3] (lbs./sq. in.) | [4] | 15.1-16.1 | 350 |
| Shear modulus [3] (lbs./sq. in.) | [4] | 16.7-17.2 | 320 |

[1] Measured perpendicualr to the foam rise on a section cut from the foam component of the laminate.
[2] Measured parallel to the foam rise on a section cut from the foam component of the laminate, and at a cross-head speed of 0.556 inch/minute.
[3] Measured at a cross-head speed of 0.556 inch/minute on a section cut from the foam component of the laminate, and perpendicular to the foam rise.
[4] Not measured.

What we claim is:

1. A foamed resin of a phenolic resole obtained by hydroxymethylating a mixture of phenolic compounds with at least an equimolar amount of formaldehyde under basic conditions, said mixture containing mononuclear phenol H$\phi$OH and, polynuclear diphenol having the structure:

$$HO\phi-CH_2-\phi'-O-\phi'-CH_2-\phi OH$$

where $\phi$ is the divalent residue of a mononuclear phenol having the structure H$\phi$OH and is phenylene or a substituted derivative thereof wherein one or more of the hydrogen atoms have been replaced by monovalent groups selected from alkyl, alkoxy and hydroxy groups and $\phi'$ is phenylene or a substituted derivative thereof wherein one or more of the hydrogen atoms have been replaced by monovalent atoms or groups selected from alkyl and alkoxy groups and halogen atoms, said polynuclear diphenol forming from one eleventh to one third of the total molar concentration of the mixture.

2. A foamed resin as claimed in claim 1 wherein the polynuclear diphenol forms from one sixth to one quarter of the total molar concentration of the mixture.

3. A foamed resin as claimed in claim 1 wherein the mixture comprises phenol and a polynuclear diphenol having the structure:

$$HOC_6H_4 \cdot CH_2 \cdot C_6H_4OC_6H_4 \cdot CH_2 \cdot C_6H_4OH$$

4. In a method of producing a foamed resin by mixing a phenolic resole with a compound capable of yielding a gas or vapour under the curing conditions and then simultaneously foaming and curing it, the improvement which comprises utilizing as the resole, the product obtained by hydroxymethylating a mixture of phenolic compounds, with at least an equimolar amount of formaldehyde under basic conditions, said mixture containing mononuclear phenol H$\phi$OH and a polynuclear diphenol of the structure:

$$HO\phi-CH_2-\phi'-O-\phi'-CH_2-\phi OH$$

where each $\phi$ is phenylene or a substituted derivative thereof in which one or more of the hydrogen atoms have been replaced by monovalent groups selected from alkyl, alkoxy and hydroxy groups, and each $\phi'$ is phenylene or substituted derivative thereof wherein one or more of the hydrogen atoms have been replaced by monovalent atoms or groups selected from the group consisting of alkyl groups, alkoxy groups and halogen atoms, said polynuclear diphenol forming from one eleventh to one third of the total molar concentration of the mixture.

5. A method as claimed in claim 4 in which the resole-forming step is effected at a temperature of from 50 to 60° C.

6. A method as claimed in claim 4 in which the viscosity of the resole is adjusted to a value corresponding to from 100 to 300 seconds on the Gardner-Holtz scale before conversion to the foamed resin.

7. A method as claimed in claim 4 in which the molar ratio of formaldehyde to phenol in the resole-forming step is from 1.5 to 1 to 2 to 1.

8. A method as claimed in claim 4 in which the molar ratio of formaldehyde to phenol in the resole-forming step is from 1.5 to 1 to 1.8 to 1.

9. A method as claimed in claim 4 which comprises condensing a mononuclear phenol with a dihalide of the structure:

$$XCH_2-\phi'-O-\phi'-CH_2X$$

where each X is halogen and each $\phi'$ is a phenylene group or substituted derivative thereof wherein one or more of the hydrogen atoms have been replaced by monovalent atoms or groups selected from the group consisting of alkyl groups, alkoxy groups and halogen atoms, in a molar ratio of mononuclear phenol to dihalide of at least 3 to 1, the condensation being effected under neutral or acidic conditions to form the polynuclear diphenol; rendering the product mixture basic; if necessary adjusting the molar ratio of mononuclear phenol to polynuclear diphenol in the product mixture to from 2 to 1 to 10 to 1, forming the resole from the resulting mixture and converting the resole to a cured foam resin.

10. A method as claimed in claim 9 in which the mononuclear phenol is phenol and the dihalide has the structure:

$$XCH_2-C_6H_4-O-C_6H_4-CH_2X$$

where each X is halogen.

11. A method as claimed in claim 1 in which the molar ratio of mononuclear phenol to polynuclear diphenol in the product mixture is adjusted to from 3 to 1 to 5 to 1.

12. A method as claimed in claim 1 in which the molar ratio of mononuclear phenol to dihalide in the condensation reaction is from 4 to 1 to 12 to 1.

13. A method asclaimed in claim 12 in which the molar ratio of mononuclear phenol to dihalide is from 5 to 1 to 7 to 1.

14. A method as claimed in claim 1 in which the condensation between the mononuclear phenol and the dihalide is effected at a temperature of from 60 to 100° C.

15. A method as claimed in claim 1 in which the condensation of the mononuclear phenol with the dihalide is effected in the presence of a Friedel-Craft's catalyst.

References Cited

UNITED STATES PATENTS

| 2,911,380 | 11/1959 | Doedens | 260—2.5 R |
| 3,047,518 | 7/1962 | Doedens | 260—2.5 R |
| 3,274,157 | 9/1966 | Doedens | 260—47 DPO |
| 3,405,091 | 10/1968 | Sprengling et al. | 260—47 DPO |
| 3,415,763 | 12/1968 | Sonnabend | 260—2.5 R |
| 3,128,259 | 4/1964 | Sonnabend | 260—52 |

MURRAY TILLMAN, Primary Examiner

M. FOELAK, Assistant Examiner

U.S. Cl. X.R.

161—205, 215, 248, 257, 263; 260—2.5 D, 52